(12) United States Patent
Li (10) Patent No.: US 9,780,624 B2
(45) Date of Patent: Oct. 3, 2017

(54) ASSEMBLY FOR HARNESSING A PENDULUM MOTION FROM FLUID WAVE ENERGY FOR CONVERSION TO POWER

(71) Applicant: Xiao Liang Li, Rowland Heights, CA (US)

(72) Inventor: Xiao Liang Li, Rowland Heights, CA (US)

( * ) Notice: Subject to any disclaimer, the term of this patent is extended or adjusted under 35 U.S.C. 154(b) by 19 days.

(21) Appl. No.: 15/162,506

(22) Filed: May 23, 2016

(65) Prior Publication Data

US 2017/0067436 A1    Mar. 9, 2017

Related U.S. Application Data

(60) Provisional application No. 62/214,382, filed on Sep. 4, 2015.

(51) Int. Cl.

| | | |
|---|---|---|
| *F03B 13/10* | (2006.01) | |
| *F03B 13/12* | (2006.01) | |
| *H02P 9/04* | (2006.01) | |
| *H02K 7/18* | (2006.01) | |
| *F03B 13/20* | (2006.01) | |
| *F03B 13/18* | (2006.01) | |

(52) U.S. Cl.
CPC .......... *H02K 7/1853* (2013.01); *F03B 13/20* (2013.01); *H02K 7/1892* (2013.01); *F05B 2250/241* (2013.01); *Y02E 10/38* (2013.01)

(58) Field of Classification Search
USPC ................................ 290/42, 53; 60/497, 507
See application file for complete search history.

(56) References Cited

U.S. PATENT DOCUMENTS

| | | | | |
|---|---|---|---|---|
| 1,864,499 | A * | 6/1932 | Grigsby | F03B 13/186 |
| | | | | 290/42 |
| 3,011,062 | A * | 11/1961 | Goldsmith | F03B 13/26 |
| | | | | 290/53 |
| 3,231,749 | A * | 1/1966 | Hinck, III | F03B 13/20 |
| | | | | 290/53 |
| 3,567,953 | A * | 3/1971 | Lord | F03B 13/262 |
| | | | | 290/42 |
| 3,668,412 | A * | 6/1972 | Vrana | F03B 13/262 |
| | | | | 290/53 |

(Continued)

*Primary Examiner* — Pedro J Cuevas
(74) *Attorney, Agent, or Firm* — Elizabeth Yang (57) ABSTRACT

An assembly for harnessing a pendulum motion from fluid wave energy to convert to power. The assembly converts a fluid wave energy into electricity through a pendulum mechanism. The pendulum mechanism makes use of a buoyant sphere that floats in a fluid and absorbs wave energy, such as oscillations, vibrations, and disturbances known in wave energy, while floating in the fluid. A hemispherical pendulum swings in relation to the wave energy. The hemispherical pendulum transmits the swinging motion to an electrical generator for conversion to electricity. The harnessing of wave energy and swinging of the hemispherical pendulum is controlled through various components that balance and stabilize the assembly. The sphere comprises components to help control the irregularities from wave energy on the hemispherical pendulum through a directional guidance member, a velocity regulation member, and a stabilization member. A transmission cable transmits the electricity to a control center on shore.

20 Claims, 5 Drawing Sheets

(56) References Cited

U.S. PATENT DOCUMENTS

| | | | | |
|---|---|---|---|---|
| 3,746,875 A * | 7/1973 | Donatelli | F03B 13/145 | 290/42 |
| 3,959,663 A * | 5/1976 | Rusby | F03B 13/262 | 290/53 |
| 4,110,630 A * | 8/1978 | Hendel | F03B 13/12 | 290/42 |
| 4,228,360 A * | 10/1980 | Navarro | F03B 13/1885 | 290/43 |
| 4,249,085 A * | 2/1981 | Kertzman | F03B 13/262 | 290/53 |
| 4,260,901 A * | 4/1981 | Woodbridge | F03B 13/1855 | 290/42 |
| 4,266,143 A * | 5/1981 | Ng | F03B 13/20 | 290/42 |
| 4,317,047 A * | 2/1982 | de Almada | F03B 13/141 | 290/53 |
| 4,355,511 A * | 10/1982 | Jones | F03B 13/1845 | 290/42 |
| 4,392,060 A * | 7/1983 | Ivy | F03B 13/1815 | 290/53 |
| 4,418,286 A * | 11/1983 | Scott | F03B 13/182 | 290/42 |
| 4,423,334 A * | 12/1983 | Jacobi | F03B 13/20 | 290/42 |
| 4,434,375 A * | 2/1984 | Taylor | F03B 13/1885 | 290/53 |
| 4,539,484 A * | 9/1985 | Suggs | F03B 13/1885 | 290/53 |
| 4,580,400 A * | 4/1986 | Watabe | F03B 13/182 | 290/53 |
| 4,599,858 A * | 7/1986 | La Stella | F03B 13/186 | 290/42 |
| 4,627,240 A * | 12/1986 | Holmes | F03B 13/1845 | 290/53 |
| 4,748,338 A * | 5/1988 | Boyce | F03B 13/20 | 290/42 |
| 4,851,704 A * | 7/1989 | Rubi | F03B 13/20 | 290/53 |
| 5,167,786 A * | 12/1992 | Eberle | B01D 61/10 | 204/228.2 |
| 6,825,574 B1 * | 11/2004 | Mooring | F03D 1/00 | 290/1 R |
| 7,105,939 B2 * | 9/2006 | Bednyak | B60L 8/00 | 290/1 R |
| 7,239,038 B1 * | 7/2007 | Zimmerman | F03B 13/20 | 290/42 |
| 7,352,073 B2 * | 4/2008 | Ames | F03B 13/12 | 290/42 |
| 7,375,436 B1 * | 5/2008 | Goldin | F03B 13/14 | 290/1 R |
| 7,453,165 B2 * | 11/2008 | Hench | F03B 13/20 | 290/42 |
| 7,525,214 B2 * | 4/2009 | Atilano Medina | F03B 13/186 | 290/42 |
| 7,629,704 B2 * | 12/2009 | Hench | F03B 13/20 | 290/42 |
| 7,687,931 B2 * | 3/2010 | Gasendo | F03B 13/186 | 290/43 |
| 7,737,569 B2 * | 6/2010 | Hench | F03B 13/20 | 290/42 |
| 7,791,213 B2 * | 9/2010 | Patterson | F03B 13/1865 | 290/53 |
| 7,964,984 B2 * | 6/2011 | Saavedra | F03D 5/06 | 290/44 |
| 7,969,033 B2 * | 6/2011 | Ryan | F03B 17/04 | 290/42 |
| 7,989,975 B2 * | 8/2011 | Clement | F03B 13/20 | 290/53 |
| 8,004,104 B2 * | 8/2011 | Hench | F03B 13/20 | 114/230.27 |
| 8,013,462 B2 * | 9/2011 | Protter | F03B 13/16 | 290/42 |
| 8,026,620 B2 * | 9/2011 | Hobdy | F03B 13/20 | 290/42 |
| 8,046,108 B2 * | 10/2011 | Hench | F03B 13/20 | 290/42 |
| 8,102,065 B2 * | 1/2012 | Hobdy | F03B 13/20 | 290/1 R |
| 8,269,365 B2 * | 9/2012 | Clement | F03B 13/20 | 290/1 R |
| 8,334,605 B2 * | 12/2012 | Catinella | F03B 13/182 | 290/42 |
| 8,487,459 B2 * | 7/2013 | Eder | F03B 13/186 | 290/42 |
| 8,723,355 B2 * | 5/2014 | Eder | F03B 13/16 | 290/42 |
| 8,901,766 B2 * | 12/2014 | Werjefelt | F03B 13/20 | 290/53 |
| 9,121,394 B2 * | 9/2015 | Bachmann | F03G 7/08 | |
| 9,570,969 B1 * | 2/2017 | Bristow, Jr. | H02K 35/02 | |
| 9,617,972 B1 * | 4/2017 | Skaf | F03B 13/20 | |
| 9,683,543 B2 * | 6/2017 | Nozawa | F03B 13/186 | |
| 2007/0138793 A1 * | 6/2007 | Zimmerman | F03B 13/20 | 290/1 R |
| 2007/0251230 A1 * | 11/2007 | Zimmerman | F03B 13/20 | 60/497 |
| 2008/0016863 A1 * | 1/2008 | Tai | F03B 13/186 | 60/497 |
| 2008/0093858 A1 * | 4/2008 | Hench | F03B 13/20 | 290/53 |
| 2008/0265582 A1 * | 10/2008 | Hench | F03B 13/20 | 290/53 |
| 2009/0008942 A1 * | 1/2009 | Clement | F03B 13/20 | 290/53 |
| 2009/0072540 A1 * | 3/2009 | McCague | F03B 13/186 | 290/53 |
| 2009/0127856 A1 * | 5/2009 | Hench | F03B 13/20 | 290/42 |
| 2009/0146429 A1 * | 6/2009 | Protter | F03B 13/16 | 290/53 |
| 2010/0032946 A1 * | 2/2010 | Begley | H02K 35/02 | 290/3 |
| 2010/0045044 A1 * | 2/2010 | Patterson | F03B 13/1865 | 290/53 |
| 2010/0102564 A1 * | 4/2010 | Hench | F03B 13/20 | 290/53 |
| 2010/0123313 A1 * | 5/2010 | Hobdy | F03B 13/20 | 290/42 |
| 2010/0228401 A1 * | 9/2010 | Hench | F03B 13/20 | 700/287 |
| 2011/0012368 A1 * | 1/2011 | Hahmann | F03B 13/187 | 290/1 C |
| 2011/0084488 A1 * | 4/2011 | Eder | F03B 13/186 | 290/53 |
| 2011/0285128 A1 * | 11/2011 | Hobdy | F03B 13/20 | 290/42 |
| 2012/0248865 A1 * | 10/2012 | Eder | F03B 13/16 | 307/9.1 |
| 2012/0261923 A1 * | 10/2012 | Hassavari | F03B 13/1845 | 290/53 |
| 2012/0280505 A1 * | 11/2012 | Thomas | F03B 13/186 | 290/53 |
| 2013/0069370 A1 * | 3/2013 | Ames | F03B 13/18 | 290/53 |
| 2013/0113211 A1 * | 5/2013 | Rohrer | F03B 13/182 | 290/42 |
| 2013/0127168 A1 * | 5/2013 | Dragic | F03B 13/1855 | 290/53 |
| 2014/0145442 A1 * | 5/2014 | Hart | F03B 13/18 | 290/53 |
| 2014/0217737 A1 * | 8/2014 | Egana Castillo | F03B 13/10 | 290/53 |
| 2015/0035283 A1 * | 2/2015 | Lee | F03B 13/1885 | 290/53 |
| 2015/0176562 A1 * | 6/2015 | Nozawa | F03B 13/186 | 290/53 |

(56) References Cited

U.S. PATENT DOCUMENTS

2016/0258412 A1\* 9/2016 Degrieck ................ F03B 13/16
2017/0047820 A1\* 2/2017 Degriek ............... H02K 7/1853
2017/0114771 A1\* 4/2017 Lim ........................ F03B 13/20

\* cited by examiner

ASSEMBLY FOR HARNESSING A PENDULUM MOTION FROM FLUID WAVE ENERGY FOR CONVERSION TO POWER

CROSS REFERENCE OF RELATED APPLICATIONS

This application claims the benefits of U.S. provisional application No. 62/214,382, filed Sep. 4, 2015, and entitled DEVICE FOR CONVERTING FLUID WAVE ENERGY TO ELECTRICITY THROUGH A PENDULUM MECHANISM, which provisional application is incorporated by reference herein in its entirety.

FIELD OF THE INVENTION

The present invention relates generally to an assembly for harnessing a pendulum motion from fluid wave energy for conversion to power. More so, an assembly is configured to convert fluid wave energy into power through the use of a pendulum mechanism that includes a buoyant sphere that absorbs wave energy while floating in a fluid; whereby the sphere contains a hemispherical pendulum that swings in relation to the wave energy and transmits the swinging motion to an electrical generator for conversion to power; whereby the hemispherical pendulum swings under the control of a directional guidance member, a velocity regulation member, and a stabilization member.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, most electricity that is generated by oil, gas, coal or nuclear power plants. Burning oil, gas and coal results in polluted air, and all of those fuel resources are rapidly diminishing as the need for electricity has skyrocketed in developed countries. Further, nuclear energy requires the disposal of spent nuclear fuel, which remains dangerous for centuries.

Many cleaner, renewable energy sources are available and known in the art. For example, Solar cells have an unlimited fuel source during daylight hours, but generate no electricity at night. Wind turbines also have a potentially unlimited power source, the wind, but will also not produce any power when the wind is light. However, with no practical way to store excess energy, these sources are generally supplemental to a fossil fuel powered energy system.

Often, wave power generation is using an electricity generation device in a hydrostatic layer of the ocean to transform the wave energy into the electrical energy. To effectively capture the wave energy, the operation of the electricity generation device in the hydrostatic layer is designed according to the up and down vibration of the wave. The movement of the electricity generation device is stabilized to capture the kinetic energy which is then utilized to generate electricity.

Generally, a successful wave power generation apparatus must be able to operate reliably in a harsh environment such as in corrosive saltwater and under less than optimal conditions for example in storms, under constant wave action, etc. Typically, a wave power electricity generation device floats on the water surface, and adopts an impeller to drive the motor rotor to rotate alternatively forward and backward. However, a large amount of energy is consumed in reversing the rotation direction of the motor rotor.

It is therefore an objective of the present invention to provide an apparatus based on a power converting method of changing reciprocating motion from wave energy into rotational motion for rotating a rotor of an electrical generator.

Other proposals have involved harnessing wave energy. The problem with these energy harnessing assemblies is that they do not magnify the force from the waves, and are not very durable. Even though the above cited energy harnessing assemblies meets some of the needs of the market, an assembly for harnessing a pendulum motion from fluid wave energy to convert to power is still desired.

SUMMARY

Illustrative embodiments of the disclosure are generally directed to an assembly for harnessing a pendulum motion from fluid wave energy for conversion to power. In one embodiment, the assembly is configured to harness power from ocean waves and subsequently convert that power into electricity. The generated electricity may then be transmitted to a control center on shore. The assembly is effective in leveraging wave energy because wave power produces low-speed, high forces, and the motion of these forces is not in a single direction, which creates large amounts of potential energy.

Specifically, the harnessing assembly converts a fluid wave energy into power through a pendulum mechanism. The pendulum mechanism makes use of a buoyant sphere that floats in a fluid and absorbs wave energy, such as oscillations, vibrations, and disturbances known to exist in wave energy, while floating in the fluid. A hemispherical pendulum in the interior region of the sphere swings in relation to the wave energy.

Through the use of a clutch and gear mechanism, the hemispherical pendulum transmits the swinging motion to an electrical generator for conversion to power. The harnessing of wave energy and swinging of the hemispherical pendulum is controlled through various components that help balance and stabilize the harnessing assembly.

To help control the capture of wave energy, and correlating swinging of the hemispherical pendulum, a plurality of vinyl chained balance balls help the sphere maintain balance while floating in the fluid. Further, a horizontal axis slide maintains the swing of the hemispherical pendulum in a substantially linear path. Further, the harnessing assembly controls the irregularities found in waves, currents, and external forces on the sphere and the hemispherical pendulum through a directional guidance member, a velocity regulation member, and a stabilization member. A transmission cable carries the power from the harnessing assembly to a control center on shore.

In one exemplary assembly, a sphere is utilized for both floatation and for containing the components described above. The sphere is defined by an outer surface, an inner surface, an interior region, a signal light, and an anchor. The sphere is configured to have sufficient buoyancy, so as to float on a fluid and thereby capture wave energy.

The assembly may further include a hemispherical pendulum that is configured to swing freely in relation to the wave energy. The hemispherical pendulum is further configured to alternate swinging between a clockwise direction and a counter-clockwise direction. This motion is a direct result of the motion from the waves.

The assembly may further include an electrical generator that is configured to operatively connect to the hemispherical pendulum. The electrical generator converts the swinging motion of the hemispherical pendulum to power, and specifically electricity.

The assembly may further include a first clutch configured to operatively connect the hemispherical pendulum to the electrical generator. The first clutch serves as a coupling mechanism, engaging the hemispherical pendulum while swinging in the clockwise direction.

The assembly may further include a first gear configured to operatively connect to the first clutch. The first gear further transmits a first rotational motion created by the engagement with the first clutch, wherein the first rotational motion actuates the electrical generator to at least partially generate power.

The assembly may further include a second clutch configured to operatively connect the hemispherical pendulum to the electrical generator. The second clutch further directly engages the hemispherical pendulum while swinging in the counter-clockwise direction. Further, a second gear operatively connects to the second clutch. The second gear transmits a second rotational motion created by the engagement with the second clutch, wherein the second rotational motion actuates the electrical generator to at least partially generate power.

The assembly may further include a directional guidance member configured to help maintain the hemispherical pendulum in a substantially linear swinging path. The assembly may further include a velocity regulation member, the velocity regulation member configured to help maintain the hemispherical pendulum at a predetermined velocity while swinging. The assembly may further include a stabilization member, the stabilization member configured to stabilize the hemispherical pendulum while swinging.

In some embodiments, the assembly may include a plurality of vinyl chained balance balls, the vinyl chained balance balls help balance the sphere during rotation. Further, a transmission cable may be used to carry the generated power towards the shore for consumption of the power.

In yet another aspect, the sphere comprises two hemispherical-shaped halves that join together at a sealed junction.

In yet another aspect, the sphere further includes a port, the port configured to enable access to the interior region of the sphere.

In yet another aspect, the signal light of the sphere is configured to blink, so as to alert to the location of the sphere.

In yet another aspect, the anchor attaches the sphere to an ocean floor or a line.

In yet another aspect, the sphere is fabricated from a buoyant material.

In yet another aspect, the rate of the swing is determined by the length of the connecting rod and the weight of the hemispherical pendulum.

In yet another aspect, the hemispherical pendulum crosses a central axis while swinging, the central axis representative of an equilibrium.

In yet another aspect, the stabilization member comprises a magnet mechanism that helps stabilize the hemispherical pendulum while swinging.

In yet another aspect, the harnessing assembly further comprises a transmission cable connector configured to join the transmission cable to the sphere.

In yet another aspect, the transmission cable is configured to carry the power to a control center on a shore.

In yet another aspect, the hemispherical pendulum comprises a horizontal axis slide, the horizontal axis slide configured to maintain the hemispherical pendulum in a linear pathway while swinging.

Other systems, harnessing assemblies, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
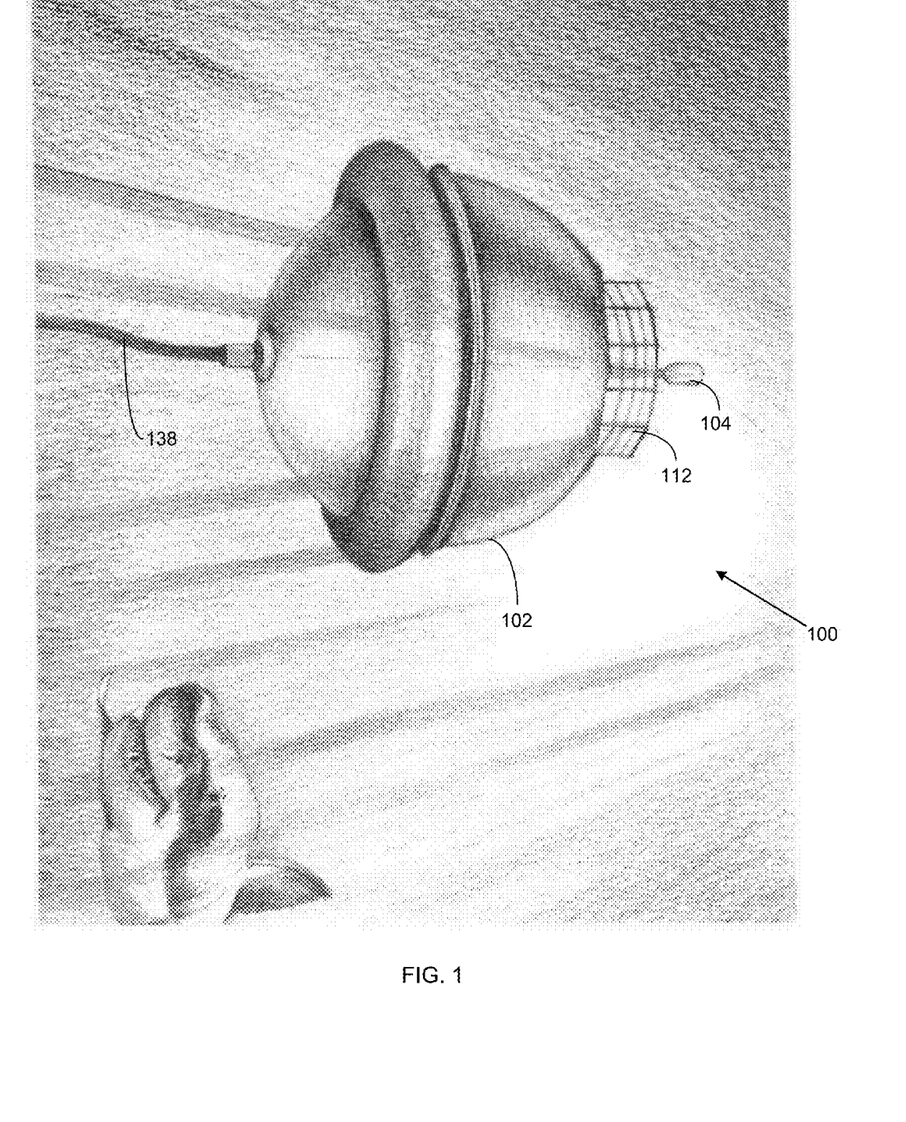
FIG. 1 illustrates a detailed perspective of an exemplary harnessing assembly for converting fluid wave energy to power through a pendulum conversion mechanism floating in an ocean environment, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific harnessing assemblies and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An assembly 100 for harnessing a pendulum motion from fluid wave energy to convert to power is referenced in FIGS. 1-5. The assembly 100 provides a sphere 102 that is operable while floating freely in a fluid, and specifically a fluid that generates motion, waves, oscillations, and the like. Those skilled in the art will recognize that the wave energy, or naturally occurring waves in the ocean, create a disturbance that oscillates, gyrates, and rotate the sphere 102. The sphere 102 absorbs this wave energy for conversion into electricity with the interior region.

The sphere 102 is effective in leveraging this wave energy because wave power produces low-speed, high forces, and the motion of these forces is not in a single direction, which creates large amounts of potential energy. The sphere 102 comprises components to help control the irregularities from wave energy on the hemispherical pendulum through a directional guidance member, a velocity regulation member, and a stabilization member.

The sphere 102 is configured to operate reliably in a harsh environment such as in corrosive saltwater and under less than optimal conditions for example in storms and under constant wave action. It is therefore an objective of the present invention to provide an assembly 100 based on a power converting method of changing reciprocating motion from wave energy into rotational or axial motion for actuating an electrical generator 122.

As described above, the assembly 100 includes a sphere 102 having buoyant properties for operation both on, and beneath the surface of the fluid. In one embodiment, the sphere 102 is configured to float on the surface of the fluid. It is known in the art that the general shape of a sphere is effective for floatation and bother buoyant properties. Further, the sphere 102 contains sufficient volume to contain the components of the assembly 100, as described below.

The fluid on which the sphere 102 floats may include waves and current that transmit wave energy to the sphere 102. The fluid may include, without limitation, an ocean, a lake, a river, and an artificial body of water. The sphere 102 is defined by an inner surface and an outer surface 136 that engages the fluid.

The sphere 102 further comprises an interior region that is substantially hollow, so as to enable buoyancy. The interior region contains an electrical generator 122. Though in some embodiments, the interior region may be sized so as to receive a person for entering and exiting through a port 108. This can be useful for performing maintenance on the assembly 100. At least one fixed head screw 128a, 128b may be used to fasten the port 108 onto the sphere 102. The fixed head screw 128a, 128b may include, without limitation, a bolt, a threaded screw, a weld, a magnet, and a nail.

In one alternative embodiment, a signal light 104 on the outer surface 136 of the sphere 102 is configured to alert airplanes, ships, and marine life about the presence of the sphere 102. The signal light 104 may include a blinking red light that attracts attention. Though any pattern or color may be used. A guard rail 112 surrounds the signal light 104 to protect against damage. A power source, such as a rechargeable battery, or the electricity generated by the assembly 100 may power the light signal.

Figure 2:
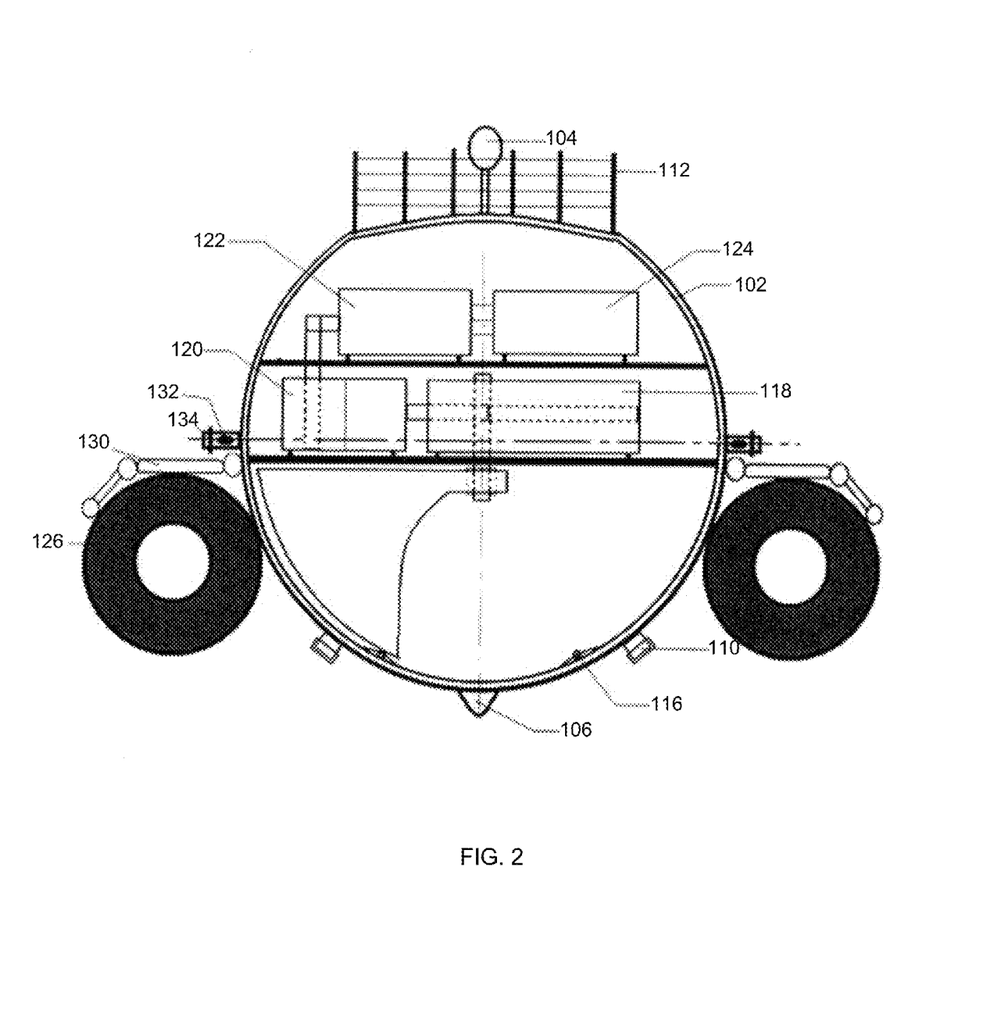
FIG. 2 illustrates a sectioned side view of an exemplary harnessing assembly for converting fluid wave energy to power through a pendulum conversion mechanism, in accordance with an embodiment of the present invention.

Looking now at FIG. 2, an anchor 106 on a bottom end of the sphere 102 helps secure the sphere 102 to a ground surface, a ship, a dock, or a cable. In one example, the anchor 106 fixedly attaches the sphere 102 to the bottom of the ocean floor, even if waves, currents, and marine life push and pull the sphere 102 in multiple directions. In another embodiment, a transmission cable 138 carries the generated electricity from the sphere 102 to a control center on the shore. A transmission cable connector 110 on the outer surface of the sphere 102 joins the transmission cable to the sphere 102. The transmission cable carries the electricity to a control center on shore.

The novelty of the electrical generator 122 is its capacity to maintain a controlled pendulum-style movement in the interior region of the sphere 102. This allows the assembly 100 to generate more efficient energy transfer, and since only mechanical transmission of wave energy and electricity is used, the operational transmission is stable and highly adaptable.

Figure 3:
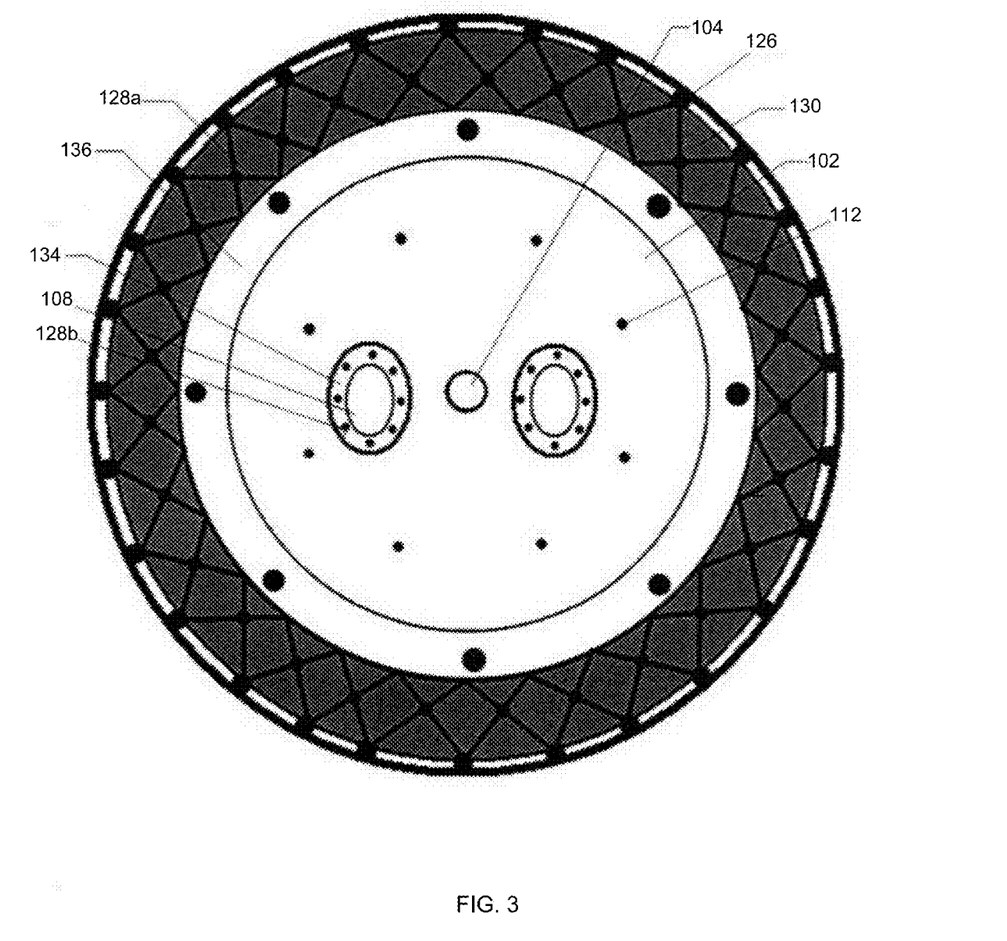
FIG. 3 illustrates a top view of the harnessing assembly for converting fluid wave energy to power through a pendulum conversion mechanism, in accordance with an embodiment of the present invention.

As shown in FIG. 3, the electrical generator 122 is based on a pendulum mechanism that utilizes a hemispherical pendulum 114 that swings freely from a pivot point. Because the electrical generator 122 uses only mechanical transmission of wave energy to electricity, a higher wave energy capture rate and energy conversion rate is possible. Further, the electrical generator 122 does not use pneumatic or hydraulic components, and thus is more simplified in its construction. Finally, the more efficient design for capturing wave energy and converting this to electricity helps reduce undesirable emissions and pollutants.

In one possible embodiment, a series of cables or rods connect the inner surface of the sphere 102 with the electrical generator 122. For example, a connecting rod extends from the inner surface of the sphere 102 to a hemispherical pendulum 114. In this manner, the electrical generator 122 remains suspended in the interior region of the sphere 102. The electrical generator 122 receives the transmitted wave energy from the sphere 102, and then converts the wave energy into electricity. Though, in another embodiment, the electrical generator 122 pivots on a central axis 132 without being suspended from the inner surface of the sphere 102.

When no wave energy is present, the hemispherical pendulum 114 rests in an equilibrium position. When wave energy from the fluid is present, the hemispherical pendulum 114 swings accordingly. The wave energy on the sphere 102 works to oscillate the hemispherical pendulum 114, causing the weight of the hemispherical pendulum 114 to swing freely. Thus, the wave energy oscillates the hemispherical pendulum 114 from the equilibrium position. In one possible embodiment, the hemispherical pendulum 114 comprises a metal panel having a curved side and a V-shaped side.

Consequently, the hemispherical pendulum 114 operates in both a clockwise, and a counter-clockwise direction as gravity and the mass of the hemispherical pendulum 114 cause it to swing back and forth. During the swinging motion, the hemispherical pendulum 114 crosses a central axis 132 that delineates the equilibrium position from the clockwise and counter-clockwise directions. A rubber seal 134 helps maintain the central axis 132 in position relative to the hemispherical pendulum 114.

Those skilled in the art will recognize that when the hemispherical pendulum 114 is displaced sideways from its resting equilibrium position, it is subject to a restoring force due to gravity that will accelerate the hemispherical pendulum 114 back towards an equilibrium position. When released, the restoring force combined with the hemispherical pendulum's 114 mass causes it to oscillate about the equilibrium position, swinging back and forth. The swinging motion generates the electricity.

As the hemispherical pendulum 114 moves to the clockwise direction, a first clutch engages the hemispherical pendulum 114. Engagement of the first clutch with the hemispherical pendulum 114 causes the energy generated by the clockwise motion of the hemispherical pendulum 114 to be transmitted to a first gear. The first gear operatively connects to the first clutch. The first gear is configured to transmit a first rotational motion created by the engagement with the first clutch. The first rotational motion actuates the electrical generator 122 to at least partially generate electricity.

Conversely, as the hemispherical pendulum 114 moves to the counter-clockwise direction, a second clutch engages the hemispherical pendulum 114. Engagement of the second clutch with the hemispherical pendulum 114 causes the energy generated by the clockwise motion of the hemispherical pendulum 114 to be transmitted to a second gear. The second gear operatively connects to the second clutch. The second gear is configured to transmit a second rotational motion created by the engagement with the second clutch. The second rotational motion actuates the electrical generator 122 to at least partially generate electricity. This back and forth movement in the clockwise and counter-clockwise directions improves the capture rate of the wave energy from the fluid.

In some embodiments, the hemispherical pendulum 114 may be adapted to create more efficient swinging motions, and thus generate greater quantities of electricity. For example, the rim of the hemispherical pendulum 114 can be increased and the center region of the hemispherical pendulum 114 made thinner. This increases the velocity of the hemispherical pendulum 114 while swinging. The material composition of the hemispherical pendulum 114 may also be altered to optimize the swinging motion.

Figure 4:
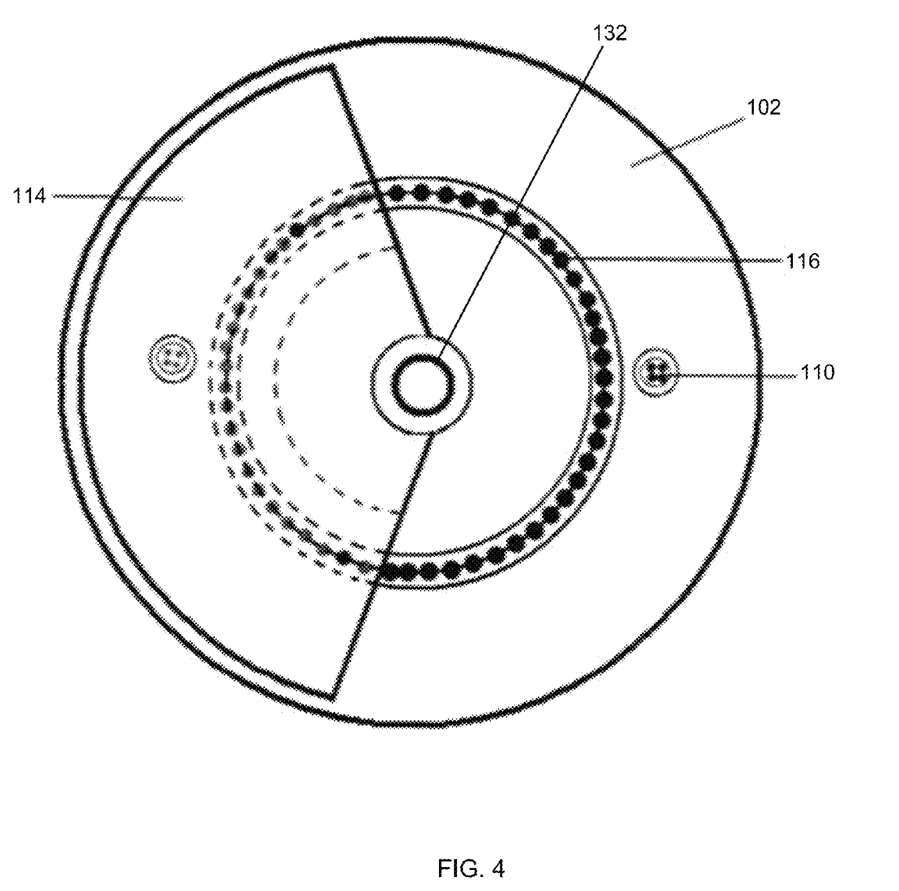
FIG. 4 illustrates a sectioned top view of an exemplary hemispherical pendulum, in accordance with an embodiment of the present invention.

As illustrated in FIG. 4, yet another component for creating a more efficient swing for the hemispherical pendulum 114 is possible through the adaptation of a horizontal axis slide 116. The horizontal axis slide 116 attaches to the bottom end of the hemispherical pendulum 114. The horizontal axis slide 116 extends from the hemispherical pendulum 114, so as to slidably engage a channel on the inner surface of the sphere 102. The horizontal axis slide 116 serves to guide the hemispherical pendulum 114 in a straight linear pathway, so as to avoid unnecessary alteration to the swinging motion by the hemispherical pendulum 114. In this manner, the hemispherical pendulum 114 swings smoothly and in a balanced motion.

Those skilled in the art, in light of the present teachings, will recognize that because waves in the ocean are indiscriminate and travel in different speeds and directions. This may cause the hemispherical pendulum 114 to have undesirable consequences when in motion. Thus, a velocity regulation member 120 and a directional guidance member 118 are used to create a more efficient motion by the hemispherical pendulum 114, and also to maintain the electrical generator 122 at a stable operational rate.

The velocity regulation member 120 maintains the hemispherical pendulum 114 at a predetermined velocity while swinging. Those skilled in the art will recognize that the time needed for one complete cycle between a clockwise swing and a counter-clockwise swing is a period. The period depends on the length of the connecting rod of the hemispherical pendulum 114, and also to a slight degree on the amplitude, the width of the swing. In one possible embodiment, the velocity regulation member 120 regulates the length of the connecting rod that is connected to the hemispherical pendulum 114. In another embodiment, the velocity regulation member 120 variably applies frictional forces to the hemispherical pendulum 114 to slow down or speed up the hemispherical pendulum 114, as required.

Looking back at FIG. 2, the directional guidance member 118 is used to help maintain the hemispherical pendulum 114 in a linear swinging path inside the interior region of the sphere 102. This guided linear path enhances the efficiency of the hemispherical pendulum 114 as it swings, which in turn creates more electricity. In one embodiment, the directional guidance member 118 enables the hemispherical pendulum 114 to operate in both a clockwise, and a counter-clockwise direction with minimal interference in either direction.

In some embodiments, a stabilization member 124 works to stabilize the hemispherical pendulum 114, while the hemispherical pendulum 114 is either stationary or swinging. This is especially important in the ocean where waves and currents can engage the sphere 102 from any angle, and thereby destabilize the hemispherical pendulum 114 to the point that it is not swinging efficiently. In one embodiment, the stabilization member 124 utilizes a magnet mechanism. In this magnetic configuration, at least one first magnet on the inner surface of the sphere 102 interacts with a second magnet on the hemispherical pendulum 114.

In yet another exemplary embodiment of a balancing function applied to the assembly 100, a plurality of vinyl chained balance balls 126 are used to help balance the sphere 102 while it is floating in the fluid. The vinyl chained balance balls 126 position equidistant around the circumference of the sphere 102. A fixation rack 130 maintains the vinyl chained balance balls 126 in their positions position. Those skilled in the art will recognize that the vinyl chained balance balls 126 may be equated to a ballast on a ship, whereby the floatation is balanced, so as to optimize the swinging motion of the hemispherical pendulum 114.

Figure 5:
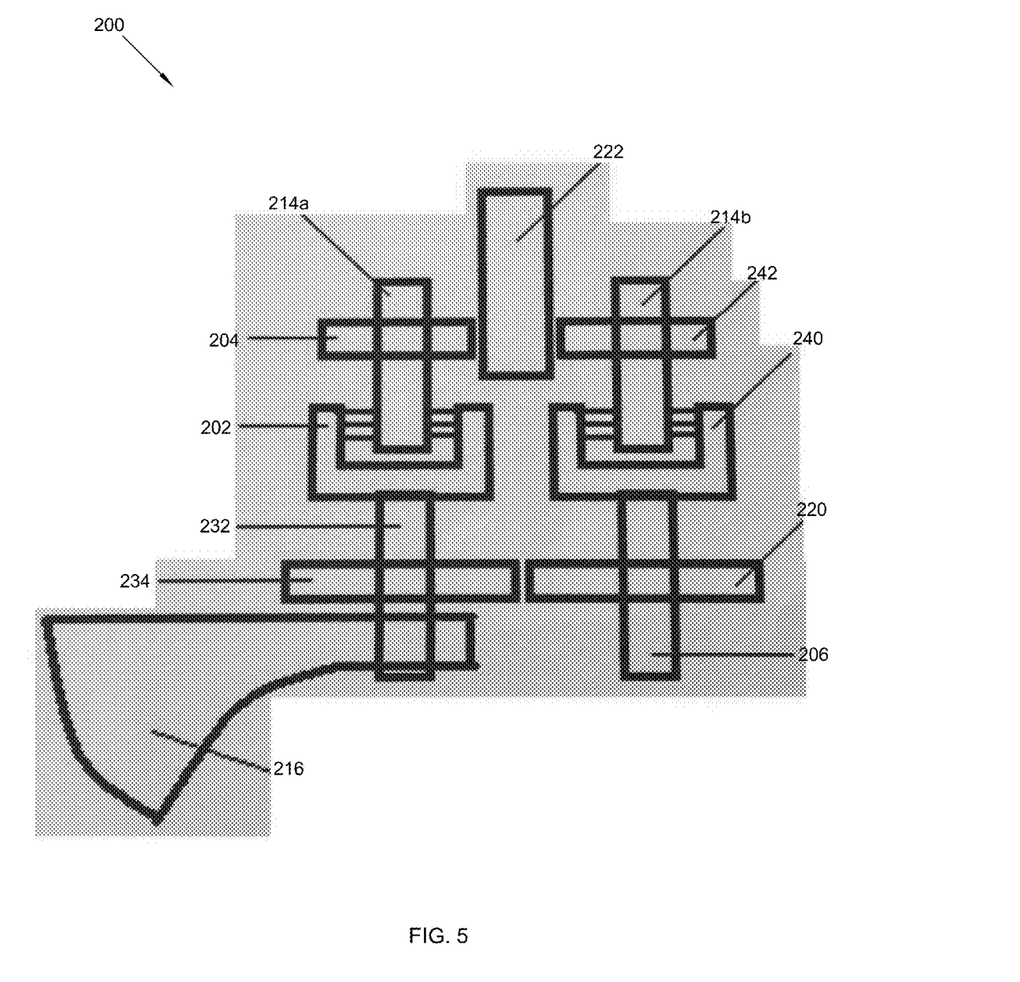
FIG. 5 illustrates a sectioned view of an exemplary alternative embodiment of a harnessing assembly for converting fluid wave energy to power, in accordance with an embodiment of the present invention.

FIG. 5 illustrates an alternative embodiment of the assembly 200. Here the assembly 200 operates in substantially the same way as described above. For example, a sphere is utilized for both floatation and for containing the components described above. However, a pair of hemispherical pendulums 214a, 214b are used to optimize the harnessing of wave energy. The pair of hemispherical pendulums 214a, 214b are configured to swing freely in relation to the wave energy. The hemispherical pendulums 214a, 214b are further configured to alternate swinging between a clockwise direction and a counter-clockwise direction. This motion is a direct result of the motion from the waves.

The assembly 200 may further include an electrical generator 222 that is configured to operatively connect to the hemispherical pendulum. The electrical generator 222 converts the swinging motion of the pair of hemispherical pendulums 214a, 214b to power, and specifically electricity. The electrical generator 222 pivots on a central axis 232 without being suspended from the inner surface of the sphere. A rubber seal 234 helps maintain the central axis 232 in position relative to the hemispherical pendulum 214a, 214b.

The assembly 200 may further include a first clutch 202 configured to operatively connect the hemispherical pendulums 214a, 214b to the electrical generator 222. The first clutch 202 serves as a coupling mechanism, engaging the hemispherical pendulums 214a, 214b while swinging in the clockwise direction.

The assembly 200 may further include a first gear 204 configured to operatively connect to the first clutch 202. The first gear 204 further transmits a first rotational motion created by the engagement with the first clutch 202. In this manner, the first rotational motion actuates the electrical generator 222 to at least partially generate power.

The assembly may further include a second clutch 240 configured to operatively connect the hemispherical pendulums 214a, 214b to the electrical generator 222. The second clutch 240 further directly engages the hemispherical pendulums 214a, 214b while swinging in the counter-clockwise direction. Further, a second gear 242 operatively connects to the second clutch. The second gear 242 transmits a second rotational motion created by the engagement with the second clutch 240. In this manner, the second rotational motion actuates the electrical generator to at least partially generate power.

Though similar, a horizontal axis slide 216 for this alternative form of assembly 200 is generally broader, so as to create more stability and guidance. Further, a velocity regulation member 220 maintains the hemispherical pendulum 114 at a predetermined velocity while swinging. And as described above, a rubber seal 234 helps maintain the central axis 132 in position relative to the hemispherical pendulums 214a, 214b.

In conclusion, assembly 100 for harnessing a pendulum motion from fluid wave energy to convert to power is operable while floating freely in a fluid, and specifically a fluid that generates motion, waves, and the like. The assembly 100 includes a sphere 102 having buoyant properties for operation on and beneath the surface of the fluid. The sphere 102 is configured to float on the surface of the fluid. The general shape of a sphere is effective for floatation and bother buoyant properties. The sphere 102 absorbs this wave energy for conversion into electricity with the interior region. Further, the sphere 102 contains sufficient volume to contain the components of the assembly 100, as described below.

The assembly 100 is effective in leveraging this wave energy because wave power produces low-speed, high forces, and the motion of these forces is not in a single direction, which creates large amounts of potential energy. The assembly 100 is configured to operate reliably in a harsh environment such as in corrosive saltwater and under less than optimal conditions for example in storms and under constant wave action.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An assembly for harnessing a pendulum motion from fluid wave energy to convert to power, the assembly comprising:
    a sphere, the sphere defined by an outer surface, an inner surface, an interior region, a signal light, and an anchor, the sphere configured to have buoyancy for capturing wave energy;
    a hemispherical pendulum, the hemispherical pendulum configured to swing freely in relation to the wave energy, the hemispherical pendulum further configured to alternate swinging between a clockwise direction and a counter-clockwise direction;
    an electrical generator, the electrical generator configured to operatively connect to the hemispherical pendulum, the electrical generator configured to convert the swinging motion of the hemispherical pendulum to electricity;
    a first clutch, the first clutch configured to operatively connect the hemispherical pendulum to the electrical generator, the first clutch further configured to engage the hemispherical pendulum while swinging in the clockwise direction;
    a first gear, the first gear configured to operatively connect to the first clutch, the first gear further configured to transmit a first rotational motion created by the engagement with the first clutch, wherein the first rotational motion actuates the electrical generator to at least partially generate electricity;
    a second clutch, the second clutch configured to operatively connect the hemispherical pendulum to the electrical generator, the second clutch further configured to engage the hemispherical pendulum while swinging in the counter-clockwise direction;
    a second gear, the second gear configured to operatively connect to the second clutch, the second gear further configured to transmit a second rotational motion created by the engagement with the second clutch, wherein the second rotational motion actuates the electrical generator to at least partially generate electricity;
    a directional guidance member, the directional guidance member configured to help maintain the hemispherical pendulum in a substantially linear swinging path;
    a velocity regulation member, the velocity regulation member configured to help maintain the hemispherical pendulum at a predetermined velocity while swinging;
    a stabilization member, the stabilization member configured to stabilize the hemispherical pendulum while swinging;
    a plurality of vinyl chained balance balls, the plurality of vinyl chained balance balls configured to help balance the sphere during rotation; and
    a transmission cable, the transmission cable configured to carry the generated electricity.

2. The assembly of claim 1, wherein the sphere floats in a fluid.

3. The assembly of claim 2, wherein the wave energy is generated by waves and current of the fluid.

4. The assembly of claim 1, wherein the sphere comprises two hemispherical-shaped halves that join together at a sealed junction.

5. The assembly of claim 1, wherein the sphere further includes a port, the port configured to enable access to the interior region of the sphere.

6. The assembly of claim 1, wherein the signal light of the sphere is configured to blink, so as to alert to the location of the sphere.

7. The assembly of claim 1, wherein the anchor attaches the sphere to an ocean floor or a line.

8. The assembly of claim 1, wherein the sphere is fabricated from a buoyant material.

9. The assembly of claim 1, wherein the rate of the swing of the hemispherical pendulum is determined by the length of the connecting rod and the weight of the hemispherical pendulum.

10. The assembly of claim 1, wherein the hemispherical pendulum crosses a central axis while swinging, the central axis representative of an equilibrium.

11. The assembly of claim 10, further including a rubber seal, the rubber seal configured to facilitate the swinging of the hemispherical pendulum about the central axis.

12. The assembly of claim 1, wherein the stabilization member comprises a magnet mechanism that helps stabilize the hemispherical pendulum while swinging.

13. The assembly of claim 1, further including a horizontal axis slide, the horizontal axis slide configured to maintain the hemispherical pendulum in a linear pathway while swinging.

14. The assembly of claim 1, wherein the sphere comprises a transmission cable connector configured to join the transmission cable to the sphere.

15. The assembly of claim 14, wherein the transmission cable is configured to carry the electricity to a control center on a shore.

16. An assembly for harnessing a pendulum motion from fluid wave energy to convert to power, the assembly comprising:
- a sphere, the sphere defined by an outer surface, an inner surface, an interior region, a signal light, and an anchor, the sphere configured to have buoyancy for capturing wave energy;
- a hemispherical pendulum, the hemispherical pendulum configured to swing freely in relation to the wave energy, the hemispherical pendulum further configured to alternate swinging between a clockwise direction and a counter-clockwise direction, whereby the hemispherical pendulum is configured to cross a central axis while swinging;
- a rubber seal, the rubber seal configured to facilitate the swinging of the hemispherical pendulum about the central axis;
- a horizontal axis slide, the horizontal axis slide configured to maintain the hemispherical pendulum in a linear pathway while swinging;
- a port, the port configured to enable access to the interior region of the sphere;
- an electrical generator, the electrical generator configured to operatively connect to the hemispherical pendulum, the electrical generator configured to convert the swinging motion of the hemispherical pendulum to electricity;
- a first clutch, the first clutch configured to operatively connect the hemispherical pendulum to the electrical generator, the first clutch further configured to engage the hemispherical pendulum while swinging in the clockwise direction;
- a first gear, the first gear configured to operatively connect to the first clutch, the first gear further configured to transmit a first rotational motion created by the engagement with the first clutch, wherein the first rotational motion actuates the electrical generator to at least partially generate electricity;
- a second clutch, the second clutch configured to operatively connect the hemispherical pendulum to the electrical generator, the second clutch further configured to engage the hemispherical pendulum while swinging in the counter-clockwise direction;
- a second gear, the second gear configured to operatively connect to the second clutch, the second gear further configured to transmit a second rotational motion created by the engagement with the second clutch, wherein the second rotational motion actuates the electrical generator to at least partially generate electricity;
- a directional guidance member, the directional guidance member configured to help maintain the hemispherical pendulum in a substantially linear swinging path;
- a velocity regulation member, the velocity regulation member configured to help maintain the hemispherical pendulum at a predetermined velocity while swinging;
- a stabilization member, the stabilization member configured to stabilize the hemispherical pendulum while swinging;
- a plurality of vinyl chained balance balls, the plurality of vinyl chained balance balls configured to help balance the sphere during rotation; and
- a transmission cable, the transmission cable configured to carry the generated electricity.

17. The assembly of claim 16, wherein the wave energy is generated by waves and current of the ocean.

18. The assembly of claim 16, wherein the sphere comprises two hemispherical-shaped halves that join together at a sealed junction.

19. The assembly of claim 16, wherein the signal light of the sphere is configured to blink, so as to alert to the location of the sphere.

20. The assembly of claim 16, wherein the stabilization member comprises a magnet mechanism that helps stabilize the hemispherical pendulum while swinging.

* * * * *